(12) United States Patent
Kani et al.

(10) Patent No.: US 11,840,362 B2
(45) Date of Patent: Dec. 12, 2023

(54) SUPPORT BODY AND SUPPORT BODY MOUNTING METHOD

(71) Applicant: MITSUBISHI HEAVY INDUSTRIES, LTD., Tokyo (JP)

(72) Inventors: Yuki Kani, Tokyo (JP); Ryota Ozaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/910,545

(22) PCT Filed: Mar. 19, 2020

(86) PCT No.: PCT/JP2020/012473
§ 371 (c)(1),
(2) Date: Sep. 9, 2022

(87) PCT Pub. No.: WO2021/186718
PCT Pub. Date: Sep. 23, 2021

(65) Prior Publication Data
US 2023/0140085 A1 May 4, 2023

(51) Int. Cl.
*B64C 1/12* (2006.01)
*B64F 5/10* (2017.01)
(Continued)

(52) U.S. Cl.
CPC .................. *B64F 5/10* (2017.01); *B64C 1/12* (2013.01); *B29C 65/02* (2013.01); *B29C 65/48* (2013.01); *B29L 2031/3076* (2013.01)

(58) Field of Classification Search
None
See application file for complete search history.

(56) References Cited

U.S. PATENT DOCUMENTS 3,976,269 A * 8/1976 Gupta ...................... B64C 1/12
428/595
5,806,797 A * 9/1998 Micale ............. G05B 19/41805
244/131
(Continued)

FOREIGN PATENT DOCUMENTS

DE  102019111836 A1 * 11/2020
EP     1149687 A2    10/2001
(Continued)

OTHER PUBLICATIONS

International Search Report of International Application No. PCT/JP2020/012473 dated Jun. 9, 2020; 5pp.
(Continued)

*Primary Examiner* — Alexander S Thomas
(74) *Attorney, Agent, or Firm* — Manabu Kanesaka; Benjamin Hauptman; Kenneth Berner

(57) ABSTRACT

A long frame is provided with: a plurality of frame members that have a longitudinal direction and a short direction, have a first flange part folded along a folding line extending along the longitudinal direction, and are arranged close to an inner peripheral surface of a surface plate along an array direction; and a plurality of first connecting parts that connect each of the plurality of first flange parts to the surface plate. The frame is further provided with at least one of a second connecting part that connects second flange parts to each other and a third connecting part that joins together end surfaces of a pair of frame members arranged adjacent to each other in the array direction to connect the pair of frame member arranged adjacent to each other.

6 Claims, 10 Drawing Sheets

(51) Int. Cl.
  *B29C 65/02* (2006.01)
  *B29C 65/48* (2006.01)
  *B29L 31/30* (2006.01)

(56) References Cited

U.S. PATENT DOCUMENTS

| | | |
|---|---|---|
| 9,102,103 B2 | 8/2015 | Fox et al. |
| 2001/0035249 A1 | 11/2001 | Kondo et al. |
| 2001/0035251 A1 | 11/2001 | Matsui |
| 2006/0048890 A1 | 3/2006 | Sato et al. |
| 2010/0148009 A1* | 6/2010 | Paul .................. B64C 1/061 244/131 |
| 2012/0027989 A1 | 2/2012 | Nishiyama et al. |
| 2014/0027573 A1 | 1/2014 | Cazeneuve et al. |
| 2018/0297300 A1 | 10/2018 | Tokutomi et al. |
| 2019/0210707 A1 | 7/2019 | Korach |

FOREIGN PATENT DOCUMENTS

| | | |
|---|---|---|
| EP | 2692631 A1 | 2/2014 |
| FR | 687024 A | 8/1930 |
| FR | 3095775 A1 | 11/2020 |
| JP | 2001310798 A | 11/2001 |
| JP | 2001315149 A | 11/2001 |
| JP | 2006056022 A | 3/2006 |
| JP | 4522796 B2 | 8/2010 |
| JP | 2017052237 A | 3/2017 |
| WO | 2010140205 A1 | 12/2010 |
| WO | 2017/090031 A1 | 6/2017 |

OTHER PUBLICATIONS

European Patent Office "Extended European Search Report with Search Opinion for European Patent Application No. 20926269.0," dated Mar. 14, 2023.

* cited by examiner

SUPPORT BODY AND SUPPORT BODY MOUNTING METHOD

RELATED APPLICATIONS

The present application is a National Phase of International Application Number PCT/JP2020/012473 filed Mar. 19, 2020.

TECHNICAL FIELD

The present disclosure relates to a support body and a support body mounting method which support an inner peripheral surface of a panel-shaped structural body disposed along a curved array direction, along the array direction.

BACKGROUND ART

In the related art, a laminate is known in which a fiber preform such as a glass fiber and a carbon fiber and a sheet-like composite material containing a resin material are laminated (for example, refer to PTL 1 and PTL 2). PTL 1 discloses a cutting-out method of cutting a flat rectangular laminate into a desired shape to manufacture a component formed of the composite material extending in a curved shape in an in-plane direction. In addition, PTL 2 discloses a method of manufacturing an annular structural body by infiltrating and curing a matrix resin after joining an annular basic preform, a flat plate annular reinforcing preform, and a cylindrical reinforcing preform.

CITATION LIST

Patent Literature

[PTL 1] U.S. Pat. No. 9,102,103
[PTL 2] Japanese Patent No. 4522796

SUMMARY OF INVENTION

Technical Problem

However, according to the method disclosed in PTL 1, an unnecessary part is generated when a composite material extending in the curved shape in the in-plane direction is cut out. Consequently, all flat rectangular laminates cannot be effectively utilized, and manufacturing costs of the composite material manufactured from the laminates inevitably increase.

In addition, for example, when a linearly extending sheet-like composite material is used to manufacture a component formed of the composite material extending in the curved shape in the in-plane direction, it is necessary to laminate the composite material while the composite material is folded in the curved shape. In this case, the composite material has a property which is less likely to expand and contract. Accordingly, there is a possibility that the composite material may be wrinkled due to deformation in a plane of the composite material when the sheet-like composite material is laminated. Then, when the wrinkled composite material is laminated over a plurality of layers, the laminate is defectively manufactured.

In addition, according to the method disclosed in PTL 2, when the annular basic preform and the flat plate annular reinforcing preform are molded, an elongated plate-shaped preform strip is deformed into an arc shape. However, when deformed into the arc shape, there is a possibility that the preforms may be wrinkled due to deformation occurring inside the plane of the preforms. Then, when the wrinkled preforms are joined, the annular structural body is defectively manufactured.

The present disclosure is made in view of the above-described circumstances, and an object of the present disclosure is to provide a support body and a support body mounting method which achieve low manufacturing costs and high productivity while ensuring support strength of a panel-shaped structural body disposed along a curved array direction.

Solution to Problem

According to an aspect of the present disclosure, there is provided an elongated support body which supports an inner peripheral surface of a panel-shaped structural body disposed along a curved array direction, along the array direction, and has a predetermined length along the array direction. The support body includes a plurality of support blocks having a longitudinal direction and a short direction, having a length in the longitudinal direction which is shorter than the predetermined length, having a first folding part folded along a first folding line extending along the longitudinal direction and a second folding part folded along a second folding line extending along the longitudinal direction, and disposed close to the inner peripheral surface of the structural body along the array direction, and a plurality of first connecting parts that connect each of the plurality of the first folding parts and the structural body. The support body further includes at least one of a second connecting part that connects a plurality of the second folding parts of the plurality of the support blocks, and a third connecting part that connects a pair of the support blocks disposed adjacent to each other in the array direction by joining end surfaces of the pair of support blocks disposed adjacent to each other in the array direction.

According to another aspect of the present disclosure, there is provided a support body mounting method of mounting a support body formed by connecting a plurality of support blocks for supporting a panel-shaped structural body disposed along a curved array direction, on an inner peripheral surface of the structural body, the support body being formed in an elongated shape having a predetermined length along the array direction. The support body mounting method includes a disposition step of disposing the plurality of support blocks having a longitudinal direction and a short direction, having a length in the longitudinal direction which is shorter than the predetermined length, having a first folding part folded along a first folding line extending along the longitudinal direction and a second folding part folded along a second folding line extending along the longitudinal direction, to be close to the inner peripheral surface of the structural body along the array direction, and a first connection step of connecting each of a plurality of the first folding parts and the structural body. The support body mounting method further includes at least one of a second connection step of connecting a plurality of the second folding parts of the plurality of support blocks, and a third connection step of connecting a pair of support blocks disposed adjacent to each other in the array direction by joining end surfaces of the pair of support blocks disposed adjacent to each other in the array direction.

Advantageous Effects of Invention

According to the present disclosure, it is possible to provide the support body and the support body mounting method which achieve low manufacturing costs and high productivity while ensuring support strength of the panel-shaped structural body disposed along the curved array direction.

DESCRIPTION OF EMBODIMENTS

Hereinafter, embodiments according to the present disclosure will be described. Each of the embodiments described below represents an aspect of the present disclosure, and is not intended to limit the present disclosure. Each of the embodiments described below can be modified in any desired way within the scope of the technical idea of the present disclosure.

First Embodiment

Figure 1:
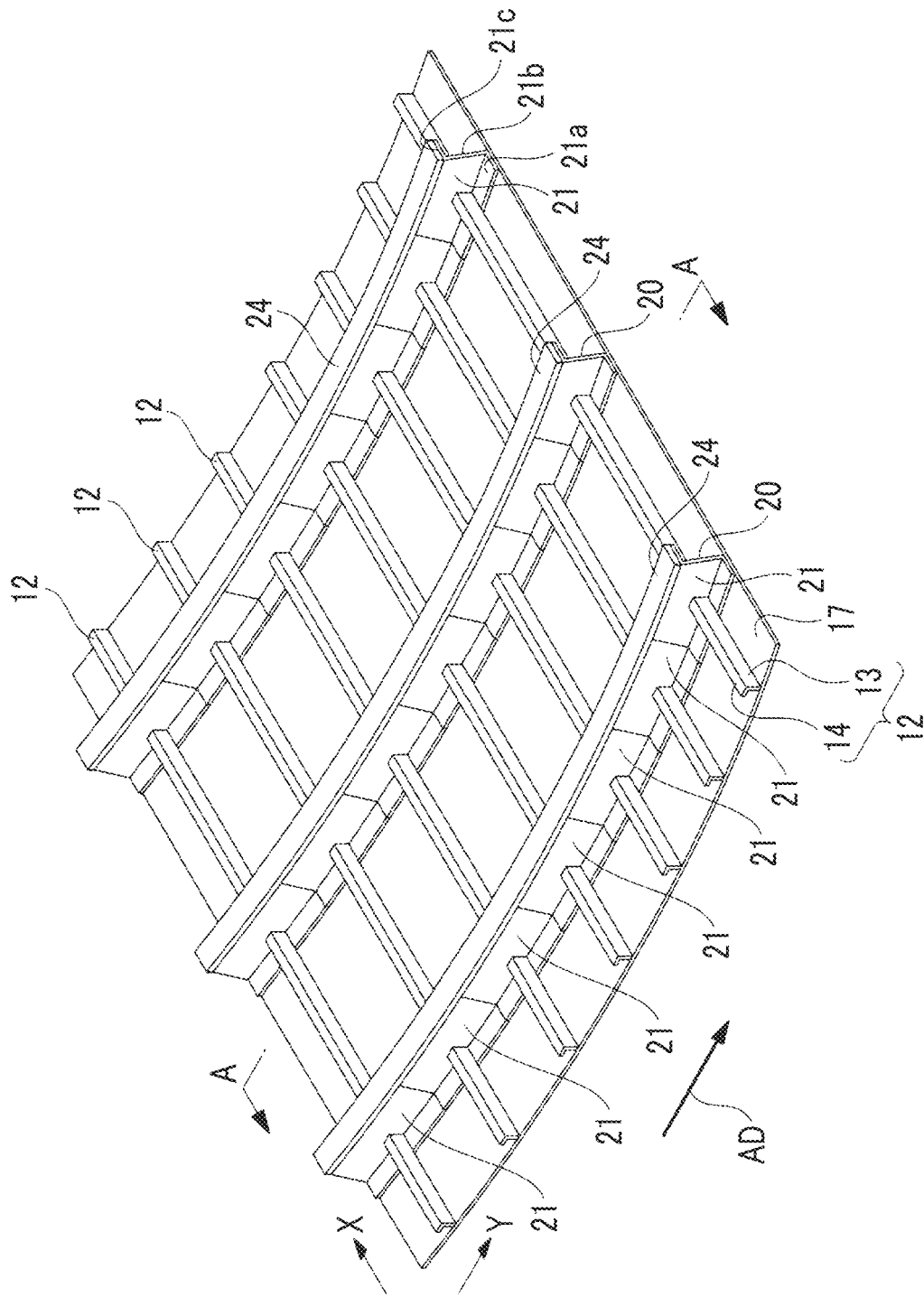
FIG. 1 is a perspective view illustrating a panel structural body according to a first embodiment of the present disclosure.

Hereinafter, a frame (support body) 20 and a mounting method of the frame 20 according to a first embodiment of the present disclosure will be described with reference to the drawings. FIG. 1 is a perspective view illustrating a panel structural body according to an embodiment of the present disclosure. The panel structural body of the present embodiment includes the frame 20 that supports a surface plate (structural body) 17.

The panel structural body of the present embodiment is a structural body forming a cylindrical fuselage of aircraft. As illustrated in FIG. 1, the panel structural body includes the surface plate 17, a plurality of ribs 12 provided to be parallel to each other on one surface of the surface plate 17, and a plurality of frames 20 provided to be parallel to each other in a direction intersecting with an extending direction of the rib 12.

The frame 20 of the present embodiment is manufactured as follows. A planar laminate in which a sheet-like composite material containing a fiber preform and a resin material is laminated over a plurality of layers (for example, 20 or more layers) is shaped into a Z-shape. Although the frame 20 illustrated in FIG. 1 has the Z-shape, the frame 20 may have another shape such as a C-shape. In the frame 20 of the present embodiment, a plurality of frame members (support blocks) 21 are connected along an array direction AD to be integrated as one member. The array direction AD illustrated in FIG. 1 is a direction in which the plurality of frame members 21 are connected and arrayed, and is an extending direction of the plurality of frame members 21 integrated as one member.

In FIG. 1, an extending direction of the rib 12 will be referred to as a rib direction RD, and an extending direction of the frame 20 will be referred to as the array direction AD. As illustrated in FIG. 1, the rib 12 includes a rib body 13 vertically erected from one surface of the surface plate 17, and a flange part 14 extending from an end portion of the rib body 13 in a direction parallel to the surface plate 17. That is, the rib 12 has an L-shape in a cross section perpendicular to the rib direction RD. One arm part of the L-shape forms the rib body 13, and the other arm part of the L-shape forms the flange part 14.

As illustrated in FIG. 1, the frame member 21 includes a frame body 21b erected from one surface of the surface plate 17, a first flange part (first folding part) 21a facing the surface plate 17 and extending from an end portion on the surface plate 17 side of the frame body 21b to one side in the rib direction RD, and a second flange part (second folding part) 21c extending from an end portion of the frame body 21b on a side far from the surface plate 17 to the other side in the rib direction RD. That is, the frame member 21 has a Z-shape in a cross section perpendicular to the array direction AD. One arm part of the Z-shape forms the first flange part 21a, and the other arm part of the Z-shape forms the second flange part 21c.

As illustrated in FIG. 1, the frame 20 has a shape extending in a curved shape in the in-plane direction (direction horizontal to a plane of the frame body 21b) of the frame body 21b. That is, the frame 20 has an arc shape formed around a central axis of a substantially cylindrical aircraft fuselage (not illustrated) formed by combining panel structural bodies.

Figure 2:
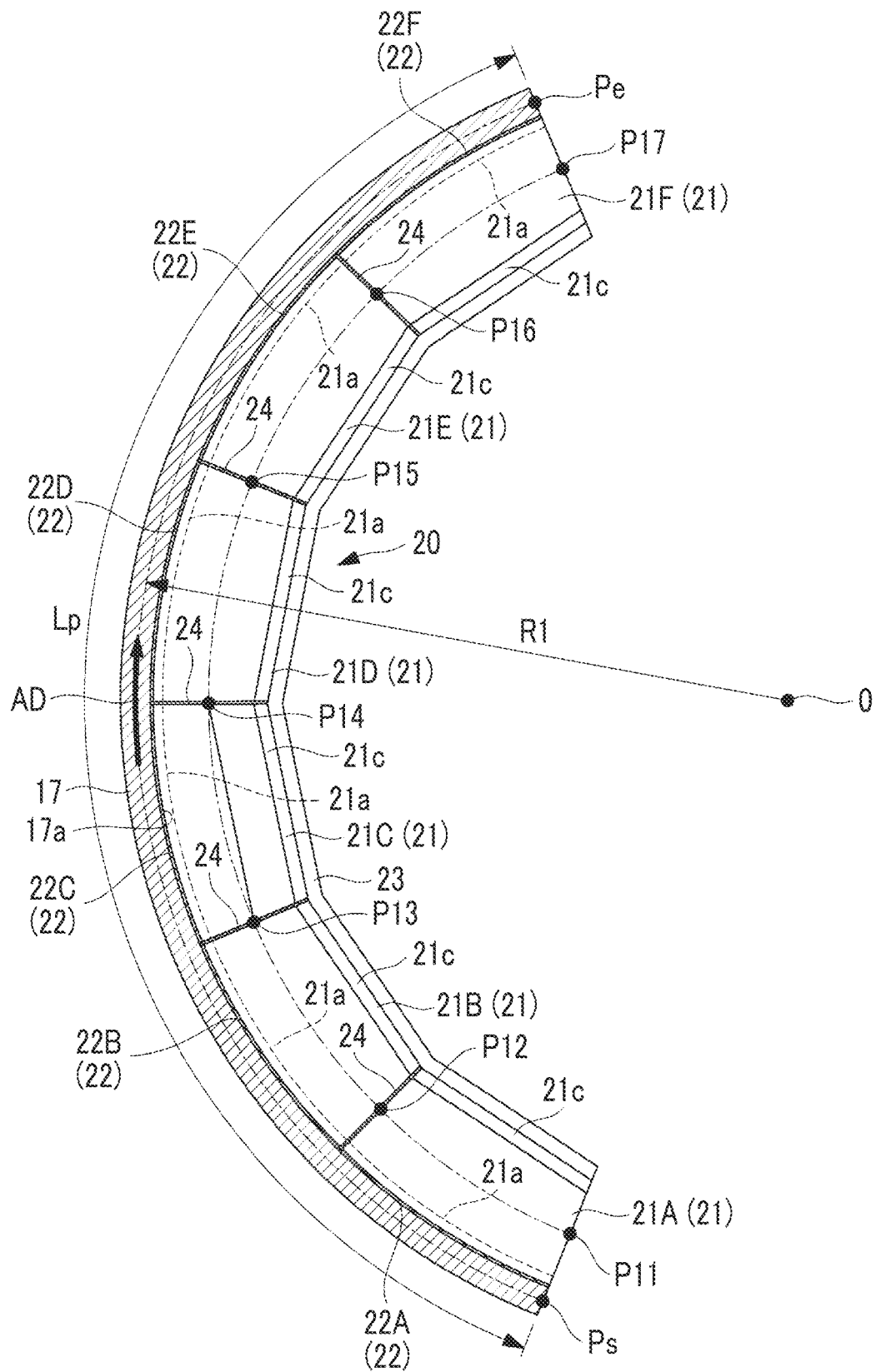
FIG. 2 is a sectional view taken along line A-A of the panel structural body illustrated in FIG. 1.
Figure 3:
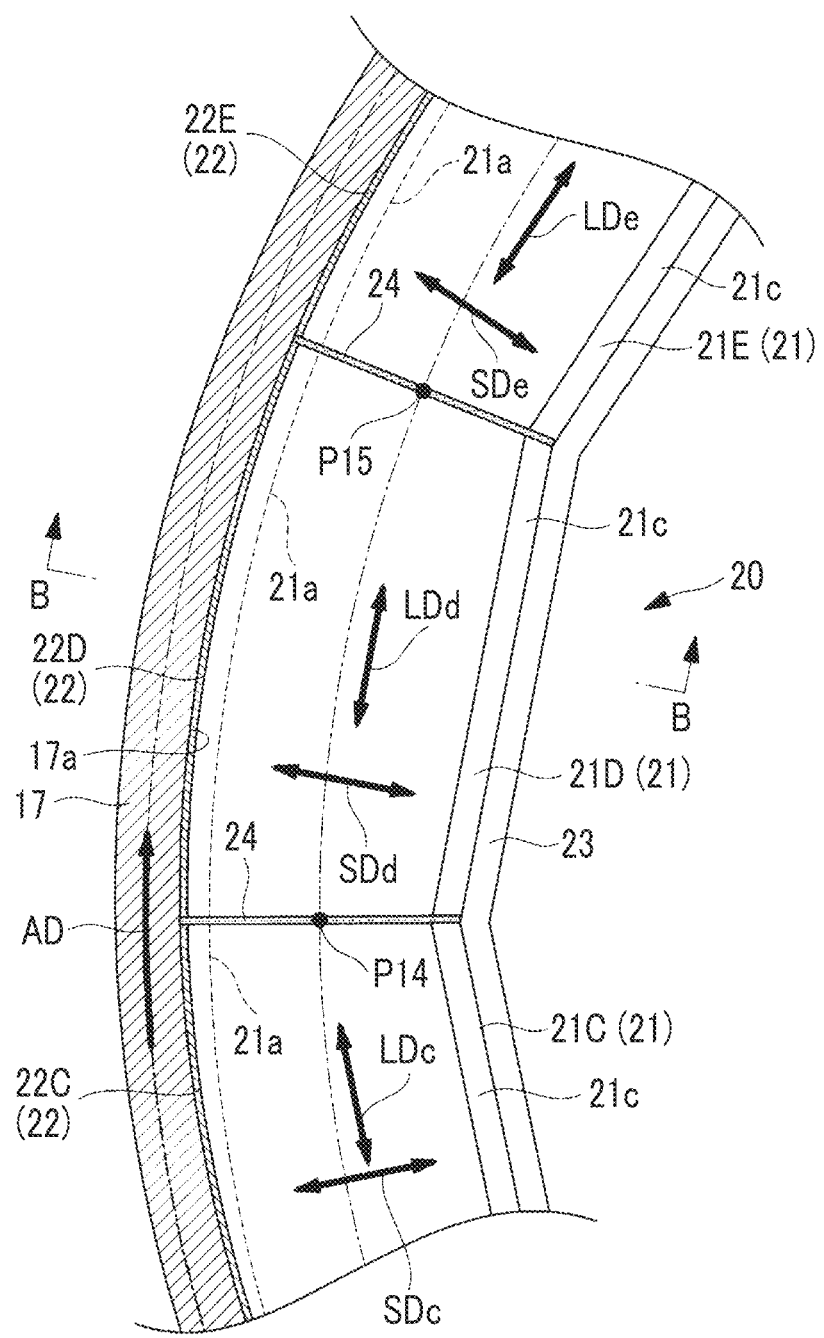
FIG. 3 is a partially enlarged view of the panel structural body illustrated in FIG. 2.
Figure 4:
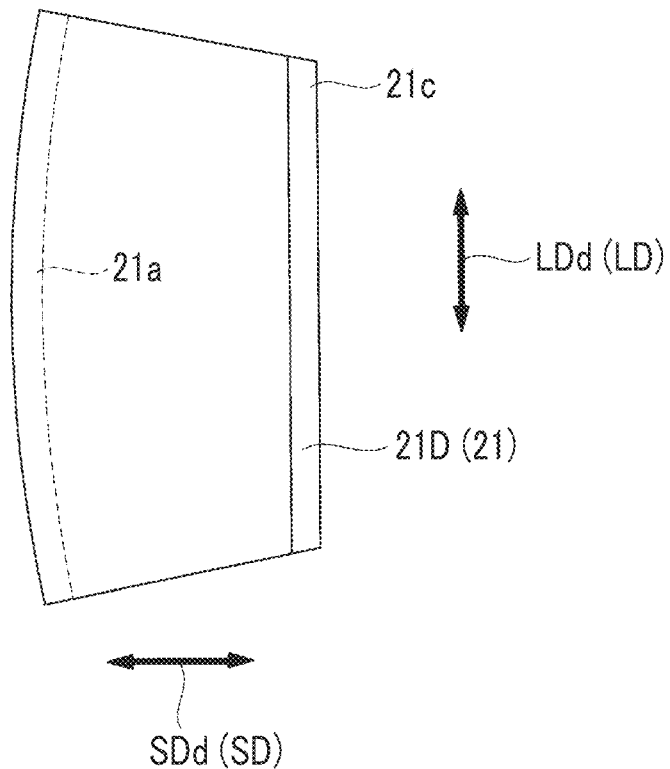
FIG. 4 is a front view of a frame member illustrated in FIG. 3.
Figure 5:
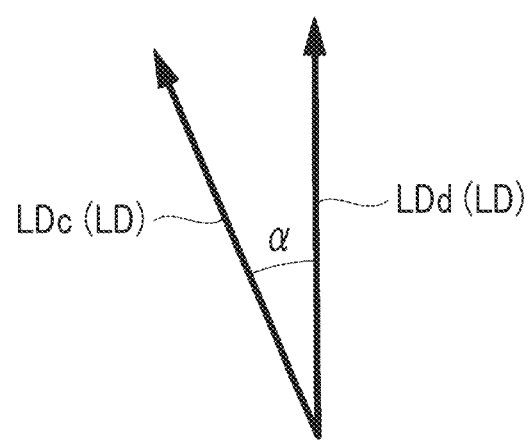
FIG. 5 is a view illustrating a relationship between a longitudinal direction of one adjacent frame member and a longitudinal direction of the other frame member.

Next, the frame 20 of the present embodiment will be described with reference to the drawings. FIG. 2 is a sectional view taken along line A-A of the panel structural body illustrated in FIG. 1. FIG. 3 is a partially enlarged view of the panel structural body illustrated in FIG. 2. FIG. 4 is a front view of a frame member 21D illustrated in FIG. 3. FIG. 5 is a view illustrating a relationship between a longitudinal direction LDc of one adjacent frame member 21 and a longitudinal direction LDd of the other frame member 21.

The frame 20 of the present embodiment is a member that supports the panel-shaped surface plate 17 disposed along the arc-shaped (curved) array direction AD, along the array direction AD. As illustrated in FIG. 2, the frame 20 of the present embodiment is a member formed in an elongated shape having a predetermined length Lp from a start position Ps to an end position Pe along the array direction AD. The frame 20 of the present embodiment includes a plurality of frame members 21, a plurality of first connecting parts 22, a second connecting part 23, and a plurality of third connecting parts 24.

The plurality of frame members 21 are disposed close to an inner peripheral surface 17a of the surface plate 17 along the array direction AD. The frame 20 is disposed without a gap along the array direction AD by bringing an end portion in the longitudinal direction of one adjacent frame member 21 along the array direction AD into contact with an end portion in the longitudinal direction of the other frame member 21. Each of the plurality of frame members 21 has a length shorter than the predetermined length Lp of the frame 20. For example, the lengths of the plurality of frame members 21 along the array direction AD are the same as each other. However, the lengths of the respective frame members 21 along the array direction AD may be different from each other.

In an example illustrated in FIG. 2, in the plurality of frame members 21, a frame member 21A, a frame member 21B, a frame member 21C, and a frame member 21D, a frame member 21E, and a frame member 21F are disposed clockwise in this order along the array direction AD passing on an arc of a radius R1 around a point O. In the example illustrated in FIG. 2, the plurality of frame members 21 are disposed at the same distance (length of the radius R1) from the point O. The radius R1 is set to any desired length, depending on a final shape of the panel structural body including the plurality of frame members 21.

In the present embodiment, the plurality of frame members 21 are disposed at positions having the same distance (length of the radius R1) from the point O. However, other aspects may be adopted. For example, the plurality of frame members 21 may be disposed at positions where the distance from the point O is any desired distance for each of the frame members 21.

As illustrated in FIG. 2, the plurality of frame members 21 are disposed so that positions P11 to P17 are end portion positions (first end portion positions) in a longitudinal direction of each member. The end portion position means one end position and the other end position of the frame member 21 when disposed along the array direction AD of the frame member 21.

The end portions of the frame member 21A in the longitudinal direction (direction along the array direction AD when the frame member 21 is disposed along the array direction AD) are disposed at the position P11 and the position P12. The end portions of the frame member 21B in the longitudinal direction are disposed at the position P12 and the position P13, and the end portions of the frame member 21C in the longitudinal direction are disposed at the position P13 and the position P14. The end portions of the frame member 21D in the longitudinal direction are disposed at the position P14 and the position P15. The end portions of the frame member 21E in the longitudinal direction are disposed at the position P15 and the position P16, and the end portions of the frame member 21F in the longitudinal direction are disposed at the position P16 and the position P17.

As illustrated in FIG. 3, the frame member 21C has a longitudinal direction LDc along the array direction AD and a short direction SDc (SD) orthogonal to the longitudinal direction LDc in a plane of the frame member 21C. The frame member 21D has a longitudinal direction LDd along the array direction AD and a short direction SDd orthogonal to the longitudinal direction LDd in a plane of the frame member 21D.

The frame member 21E has a longitudinal direction LDe along the array direction AD and a short direction SDe orthogonal to the longitudinal direction LDe in a plane of the frame member 21E. The frame member 21A, the frame member 21B, the frame member 21E, and the frame member 21F also have the longitudinal direction LD and the short directions orthogonal to the longitudinal direction LD in planes of the frame member 21A, the frame member 21B, the frame member 21E, and the frame member 21F.

As illustrated in FIG. 4, the frame member 21D has a substantially trapezoidal shape having equal legs in which the length in the longitudinal direction LDd on the other side (outer peripheral side with respect to the point O) in the short direction SDd is longer than the length in the longitudinal direction LDd on one side (inner peripheral side with respect to the point O) in the short direction SDd. The other frame members 21 (21A, 21B, 21C, 21E, and 21F) also have the same shape. The shape of the frame member 21 is not limited to the shape illustrated in FIG. 4, and any other shape may be used as long as the plurality of frame members 21 can be disposed without a gap along the array direction AD.

The frame 20 of the present embodiment is disposed without the gap along the array direction AD so that a side position of the end portion in the longitudinal direction LD of the frame member 21 having the trapezoidal shape having the equal legs coincides with a side position of the end portion in the longitudinal direction LD of the other adjacent frame member 21. In the present embodiment, the end portion in the longitudinal direction LD of one adjacent frame member 21 along the array direction AD and the end portion in the longitudinal direction LD of the other frame member 21 are disposed without the gap. The frame member 21 is molded from a laminate formed of a sheet-like composite material containing a fiber preform and a resin material.

As illustrated in FIGS. 2 and 3, the length in the longitudinal direction LD of the frame member 21 is sufficiently shorter than the predetermined length Lp along the array direction AD of the frame 20. For example, when an intersection angle α (to be described later) is set to 22.5° and the predetermined length Lp is set to the length corresponding to a half circumference (range of 180° around the point O) of a circle having a radius R1, the length of the longitudinal direction LD of the frame member 21 is ⅛ of the predetermined length Lp. In addition, for example, when the intersection angle α (to be described later) is set to 22.5° and the predetermined length Lp is set to the length corresponding to a ¼ circumference (range of 90° around the point O) of the circle having the radius R1, the length in the longitudinal direction LD of the frame member 21 is ¼ of the predetermined length Lp.

The composite material laminated as the laminate used for molding the frame member 21 is a sheet-like material containing the fiber preform (for example, a carbon fiber or a glass fiber) and the resin material. As the resin material, any one of a thermosetting resin material and a thermoplastic resin material can be used. For example, the thermosetting resin material is an epoxy resin, unsaturated polyester, vinyl ester, phenol, cyanate ester, or polyimide.

For example, the thermoplastic resin material is polyether ether ketone (PEEK), polyethylene terephthalate (PET), polybutylene terephthalate (PBT), nylon 6 (PA6), nylon 66 (PA66), polyphenylene sulfide (PPS), polyetherimide (PEI), or polyether ketone ketone (PEKK).

As illustrated in FIG. 2, each of the frame members 21A, 21B, 21C, 21D, 21E, and 21F is disposed along the curved array direction AD so that the longitudinal direction LD of one adjacent frame member 21 and the longitudinal direction LD of the other frame member 21 intersect with each other. For example, as illustrated in FIGS. 3 and 5, the frame members are disposed so that the longitudinal direction LDd of one adjacent frame member 21D and the longitudinal direction LDc of the other frame member 21C intersect with each other at the intersection angle α.

Here, the intersection angle α is preferably set to 45 degrees or smaller. In the frame 20 of the present embodiment, the plurality of frame members 21 are disposed along the arc-shaped array direction AD. However, each of the frame members 21 is not formed in the arc shape, and is linearly formed along the longitudinal direction LD. Therefore, the longitudinal direction LD and the array direction AD of the frame member 21 do not completely coincide with each other, and are approximate to each other.

When the intersection angle α increases, a degree of approximation between the longitudinal direction LD of the frame member 21 and the array direction AD decreases. Therefore, it is preferable to set an upper limit for the intersection angle α to secure the degree of approximation between the longitudinal direction LD and the array direction AD. Since the intersection angle α is set to 45 degrees or smaller, a change in the longitudinal direction LD in the pair of adjacent frame members 21 can be suppressed to 45 degrees or smaller, and the degree of approximation between the longitudinal direction LD and the array direction AD can be secured.

In the present embodiment, the reason that the intersection angle α is set to 45 degrees or smaller is as follows. For example, the frame member 21 of the present embodiment is a member that supports the surface plate 17 forming the cylindrical fuselage of the aircraft, and needs to ensure sufficient strength against stress along the array direction AD in which the frame 20 extends. Therefore, it is desirable that a fiber direction of the fiber preform formed of some sheet-like composite material contained in the laminate forming the frame member 21 coincides with the array direction AD.

However, as described above, the longitudinal direction LD and the array direction AD of the frame member 21 do not completely coincide with each other, and are approximate to each other. A tangential direction TD illustrated in FIG. 5 is a tangential direction of a circle passing through the position P14 around the point O, and indicates the array direction AD at the position P14 in FIG. 3. At the position P14, it is desirable to dispose the fiber preform along the tangential direction TD. However, the fiber direction of the fiber preform of the frame member 21C is the longitudinal direction LDc. Therefore, the tangential direction TD and the longitudinal direction LDc are different by α/2 which is half of the intersection angle α. Similarly, the fiber direction of the fiber preform of the frame member 21D is the longitudinal direction LDd, and the tangential direction TD and the longitudinal direction LDd are different by α/2 which is half of the intersection angle α.

In general, as the fiber preform of the sheet-like composite material, the fiber preform is selected from a plurality of types of fiber preforms having different fiber directions by every 45 degrees such as 0 degrees, 45 degrees, −45 degrees, and 90 degrees. When the plurality of frame members 21 are integrated as the frame 20, it is desirable that a base axis (axis in a direction of the 0 degrees) on which the composite material is disposed coincides with the array direction AD. Then, in order that the base axis coincides with or is approximate with the array direction AD, it is desirable that a difference in the fiber directions of the frame members 21 disposed adjacent to each other is 45 degrees or smaller. Therefore, in the present embodiment, the intersection angle α is set to 45 degrees or smaller (α/2 is set to 22.5 degrees or smaller).

Figure 6:
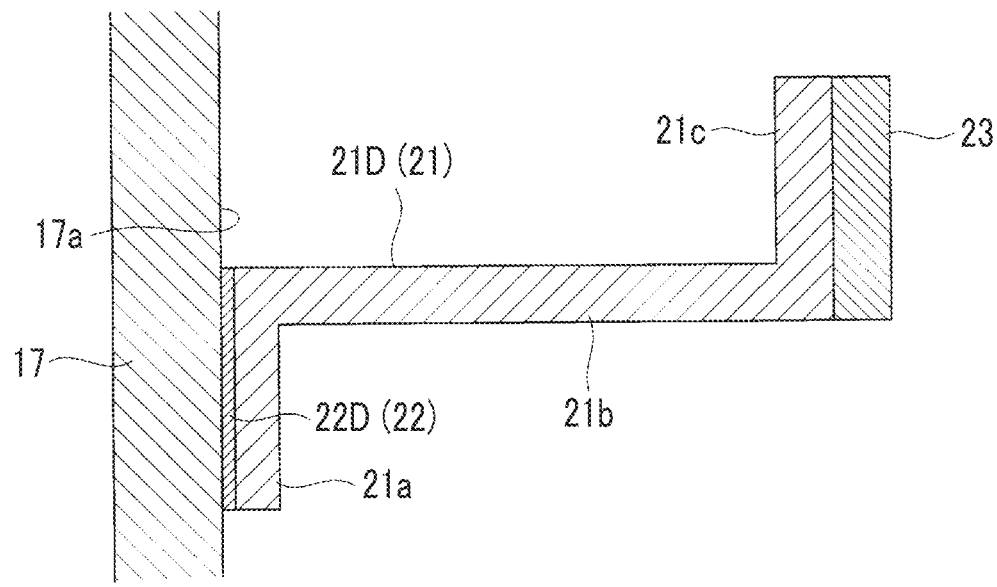
FIG. 6 is a sectional view taken along line B-B of the panel structural body illustrated in FIG. 3.
Figure 7:
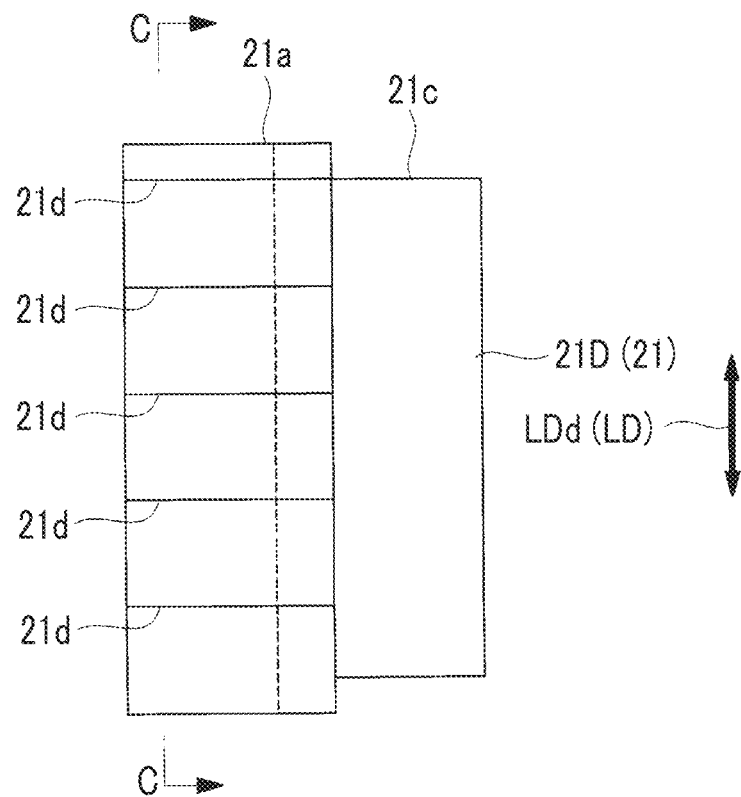
FIG. 7 is a left side view of FIG. 4.
Figure 8:
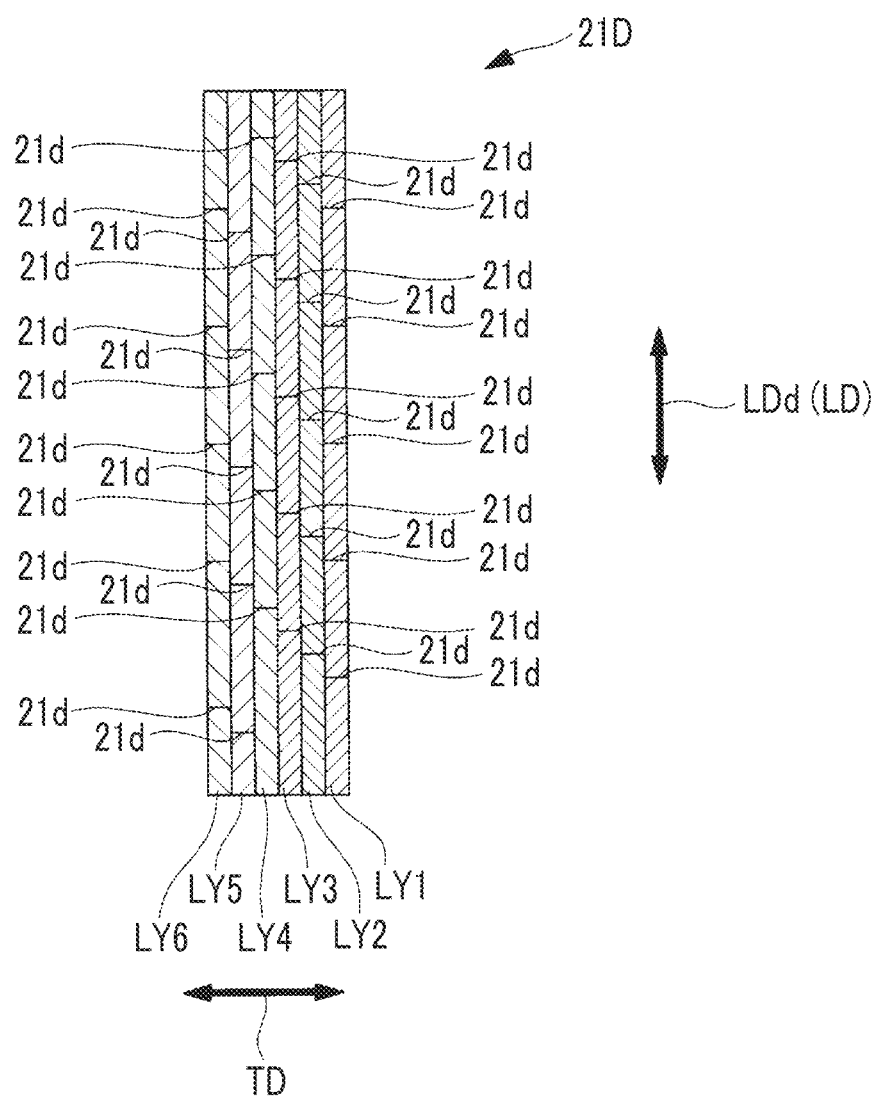
FIG. 8 is a sectional view taken along line C-C in FIG. 7.
Figure 9:
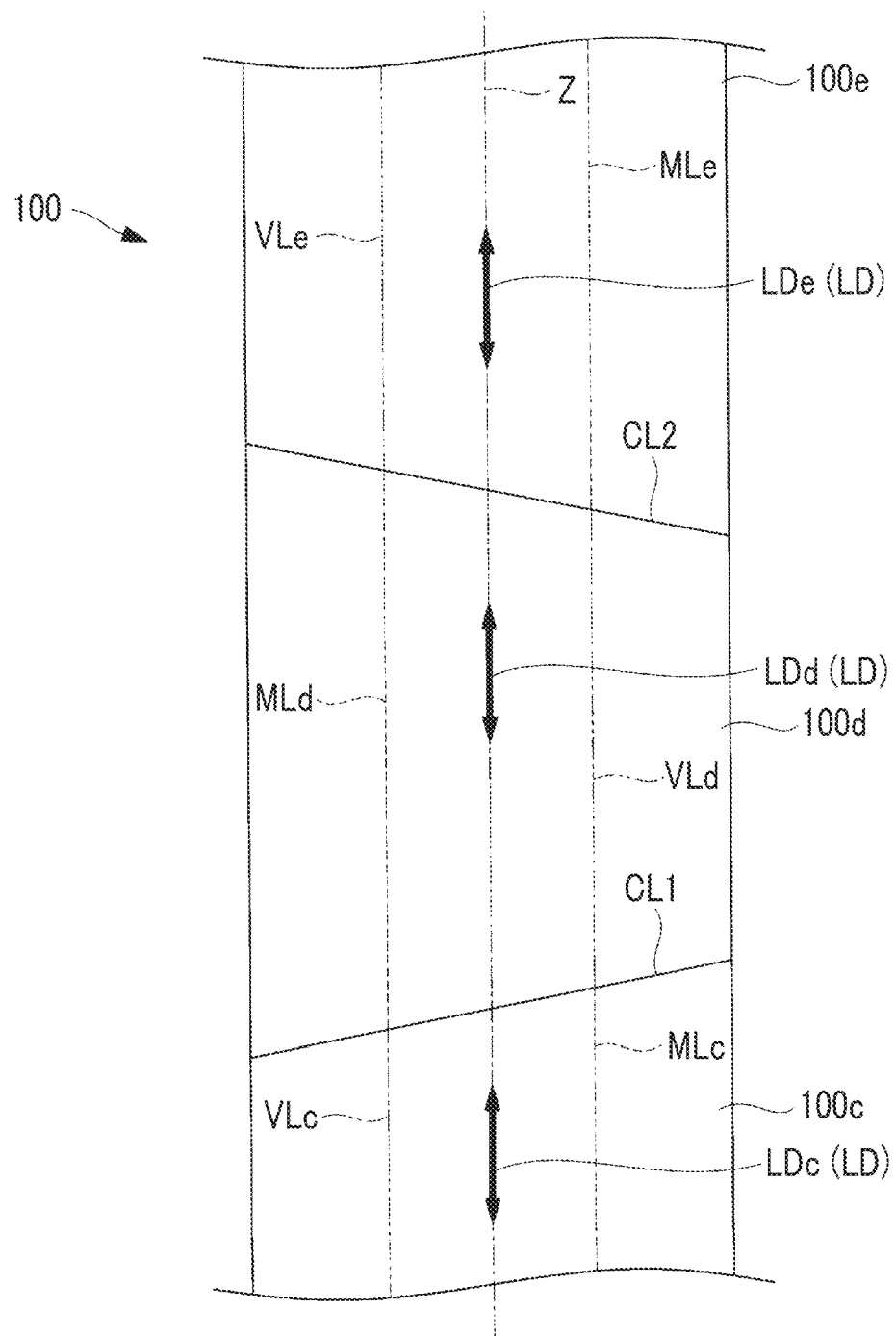
FIG. 9 is a plan view illustrating a laminate before a frame member is molded.

Next, the first flange part 21a and the second flange part 21c of the frame member 21 will be described with reference to the drawings. FIG. 6 is a sectional view taken along line B-B of the panel structural body illustrated in FIG. 3. FIG. 7 is a left side view of FIG. 4. FIG. 8 is a sectional view taken along line C-C in FIG. 7. FIG. 9 is a plan view illustrating a laminate 100 before the frame member 21 is molded.

As illustrated in FIGS. 6 and 7, the frame member 21 of the present embodiment has a Z-shape in a cross section on a plane orthogonal to the array direction AD, and includes a frame body 21b, a first flange part 21a folded to one side (lower side in FIG. 6) with respect to the frame body 21b, and a second flange part 21c folded to one side (upper side in FIG. 6) with respect to the frame body 21b.

The first flange part 21a and the second flange part 21c are parts formed by shaping the laminate 100 before the frame member 21 illustrated in FIG. 9 is molded. FIG. 9 illustrates the elongated laminate 100 extending along an axis Z and disposed along a flat surface.

The flat laminate 100 illustrated in FIG. 9 is cut by a cutting line CL1 and a cutting line CL2 to mold the plurality of frame members 21 including the frame members 21C, 21D, and 21E. A laminate 100c cut from the laminate 100 is shaped in a state of being folded at a right angle along a mountain folding line (first folding line) MLc linearly extending along the longitudinal direction LDc parallel to the axis Z, and is shaped in a state of being folded at a right angle along a valley folding line (second folding line) VLc linearly extending along the longitudinal direction LDc. The axis Z is an axis along an extending direction of the laminate 100.

The frame member 21 of the present embodiment has a substantially trapezoidal shape in a front view. The cutting lines CL1 and CL2 are lines intersecting with the axis Z without being orthogonal to the axis Z. In addition, the cutting lines CL1 and CL2 have different inclination angles with respect to the axis Z.

A laminate 100d cut from the laminate 100 is shaped in a state of being folded at a right angle along a mountain folding line (folding line) MLd linearly extending along the longitudinal direction LDd parallel to the axis Z, and is shaped in a state of being folded at a right angle along a valley folding line (folding line) VLd linearly extending along the longitudinal direction LDd. A laminate 100e cut from the laminate 100 is shaped in a state of being folded at a right angle along a mountain folding line (folding line) MLe linearly extending along the longitudinal direction LDe parallel to the axis Z, and is shaped in a state of being folded at a right angle along a valley folding line (folding line) VLe linearly extending along the longitudinal direction LDe.

In the laminate 100 (100c, 100d, or 100e), a part folded along the mountain folding line ML (MLc, MLd, or MLe) is the first flange part 21a and a part folded along the valley folding line VL (VLc, VLd, or VLe) is the second flange part 21c.

As illustrated in FIG. 7, the first flange part 21a disposed to face the inner peripheral surface 17a of the surface plate 17 has a plurality of slits 21d orthogonal to the array direction AD and extending along the in-plane direction (normal direction of the paper surface in FIGS. 2, 3, and 6) along the inner peripheral surface 17a of the surface plate 17. As illustrated in FIG. 8, the first flange part 21a is configured so that the composite materials are laminated on six layers of a first layer LY1, a second layer LY2, a third layer LY3, a fourth layer LY4, a fifth layer LY5, and a sixth layer LY6. The first flange part 21a may be formed by laminating the composite materials on any desired number of layers other than the six layers.

As illustrated in FIG. 8, in the first flange part 21a of the frame member 21D, the slits 21d extending in a direction orthogonal to the longitudinal direction LDd in a plane of the first flange part 21a are formed at five locations along the longitudinal direction LDd. The slits 21d are formed at every five locations in each of the first layer LY1 to the sixth layer. Positions in the longitudinal direction LDd of the slits 21d formed in each of the first layer LY1 to the sixth layer are different positions. The reason is as follows. When the positions of the slits 21d in the longitudinal direction LDd coincide with each other, strength and toughness of the first flange part 21a decrease.

The plurality of slits 21d are provided on each layer of the composite material forming the first flange part 21a. In this manner, a plurality of regions of the first flange part 21a partitioned by the plurality of slits 21d can be independently deformed to be close to the inner peripheral surface 17a of the surface plate 17, and can be brought into contact with the inner peripheral surface 17a.

Next, a structure for connecting each of the plurality of frame members 21 and the surface plate 17 will be described.

As illustrated in FIG. 2, the plurality of first connecting parts 22 (22A, 22B, 22C, 22D, 22E, and 22F) are parts that connect each of the plurality of first flange parts 21a of the frame member 21 and the inner peripheral surface 17a of the surface plate 17.

When the surface plate 17 is formed of the composite material containing the fiber preform and the thermoplastic resin material, for example, the first connecting part 22 is a part formed by welding the thermoplastic resin material contained in the frame member 21 and the thermoplastic resin material contained in the surface plate 17. In this case, the first connecting part 22 connects the frame member 21 and the surface plate 17 by welding the thermoplastic resin material contained in the frame member 21 and the thermoplastic resin material contained in the surface plate 17.

When the surface plate 17 is formed of the composite material containing the fiber preform and the thermosetting resin material, for example, the first connecting part 22 is an adhesive layer formed between the first flange part 21a of the frame member 21 and the surface plate 17 by an adhesive agent. In this case, the first connecting part 22 connects the frame member 21 and the surface plate 17 by the adhesive layer.

In addition, the first connecting part 22 may connect each of the plurality of first flange parts 21a of the plurality of frame members 21 and the surface plate 17 via a fastening bolt, for example. In addition, the first connecting part 22 may connect the frame member 21 and the surface plate 17 by welding the thermoplastic resin material contained in the frame member 21 and the thermoplastic resin material contained in the surface plate 17.

The second connecting part 23 is a part that connects the pair of frame members 21 disposed adjacent to each other in the array direction AD, and is called a splice, for example. The second connecting part 23 illustrated in FIGS. 2, 3, and 6 is a sheet-like member that connects the plurality of second flange parts 21c of the plurality of frame members 21 and extends along the array direction AD.

When the second connecting part 23 is formed of the composite material containing the fiber preform and the thermoplastic resin material, for example, the second connecting part 23 is joined by welding the thermoplastic resin material contained in itself and the thermoplastic resin material contained in the frame member 21. In addition, when the second connecting part 23 is formed of the composite material containing the fiber preform and the thermosetting resin material or another material, for example, the second connecting part 23 is joined to each of the plurality of second flange parts 21c of the plurality of frame members 21 by an adhesive agent. In addition, the second connecting part 23 may be connected to each of the plurality of second flange parts 21c of the plurality of frame members 21 via a fastening bolt, for example.

The third connecting part 24 is a part that connects the pair of frame members 21 disposed adjacent to each other without a gap along the array direction AD. For example, the third connecting part 24 is a part formed by welding the thermoplastic resin material contained in one of the frame members 21 disposed adjacent to each other and the thermoplastic resin material contained in the other of the frame members 21. The third connecting part 24 joins an entire region of end surfaces of the pair of frame members 21 disposed adjacent to each other by heat welding.

In addition, the third connecting part 24 may be an adhesive layer disposed between the end surfaces of the pair of frame members 21 disposed adjacent to each other. In this case, the third connecting part 24 connects the end surfaces of the pair of frame members 21 disposed adjacent to each other by an adhesive layer formed of an adhesive agent. In addition, the third connecting part 24 may connect the pair of frame members 21 disposed adjacent to each other via a fastening bolt, for example.

Figure 10:
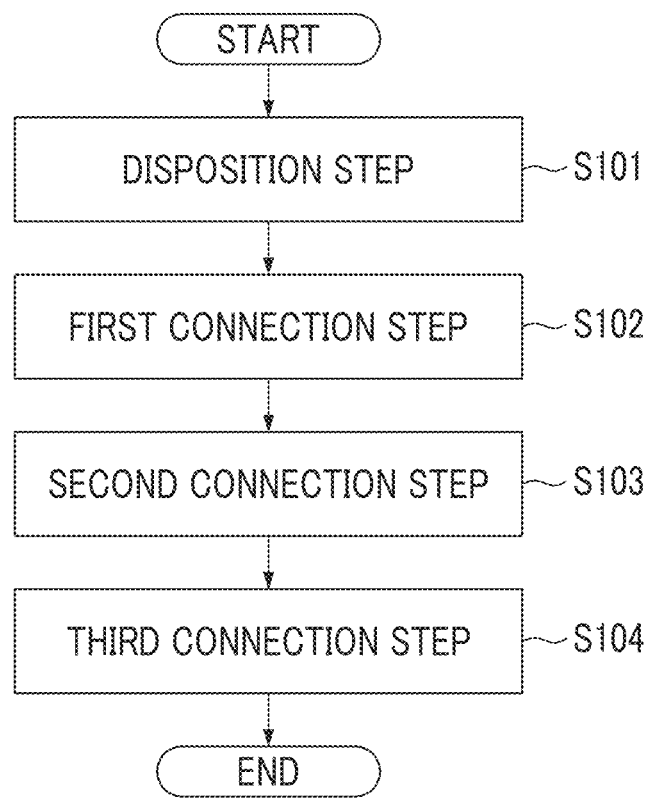
FIG. 10 is a flowchart illustrating a mounting method of a frame according to the present embodiment.

Next, referring to FIG. 10, a mounting method for mounting the frame 20 of the present embodiment on the surface plate 17 will be described. FIG. 10 is a flowchart illustrating the mounting method of the frame 20 of the present embodiment.

In Step S101, the plurality of frame members 21 are brought close to the inner peripheral surface 17a of the surface plate 17, and the end portion in the longitudinal direction LD of one adjacent frame member 21 along the array direction AD and the end portion in the longitudinal direction LD of the other frame member 21 are disposed without a gap.

In Step S102, each of the plurality of frame members 21 disposed along the array direction AD and the surface plate 17 are connected by the first connecting part 22. For example, each of the plurality of frame members 21A, 21B, 21C, 21D, 21E, and 21F is connected to the inner peripheral surface 17a of the surface plate 17 by the first connecting parts 22A, 22B, 22C, 22D, 22E, and 22F formed by heat welding.

In Step S103, the pair of frame members 21 disposed adjacent to each other along the array direction AD are connected by the second connecting part 23. The second connecting part 23 is joined to each of the plurality of second flange parts 21c of the plurality of frame members 21 by heat welding, for example.

In Step S104, the pair of frame members 21 disposed adjacent to each other along the array direction AD without a gap are connected by the third connecting part 24. The third connecting part 24 connects the pair of frame members 21 disposed adjacent to each other by heat welding, for example.

The frame 20 is mounted on the surface plate 17 through Steps S101 to S104 described above.

In the above description, in the mounting method for mounting the frame 20 on the surface plate 17, both a second connection step of Step S103 and a third connection step of Step S104 are performed. However, another aspect may be adopted. For example, only one of the second connection step and the third connection step may be performed. In this case, the panel structural body on which the frame 20 is mounted in the above-described flowchart does not include either the second connecting part 23 or the third connecting part 24.

In addition, in the above description, the second connection step of Step S103 is performed after the first connection step of Step S102, and the third connection step of Step S104 is performed after the second connection step of Step S103. However, another aspect may be adopted. For example, the first connection step, the second connection step, and the third connection step may be performed in any desired order.

Operations and advantageous effects of the frame 20 of the present embodiment described above will be described.

According to the frame 20 in the present embodiment, the frame 20 includes the plurality of frame members 21 which support the inner peripheral surface 17a of the panel-shaped surface plate 17 disposed along the curved array direction AD, along the array direction AD. The frame member 21 includes the first flange part 21a folded along the mountain folding line ML linearly extending along the longitudinal direction LD.

When the frame member 21 of the frame 20 according to the present embodiment is molded, the laminate having the plurality of layers formed of the composite material containing the fiber preform and the resin material is merely folded (shaped) along the linear mountain folding line ML. Therefore, compared to a case where the laminate is folded along the curved array direction AD, a step of folding the laminate is easier, and the laminate is less likely to be wrinkled when the laminate is folded.

In addition, according to the frame 20 in the present embodiment, the length in the longitudinal direction LD of the frame member 21 is shorter than the predetermined length Lp in the array direction AD of the frame 20, and the frame 20 is formed by connecting the plurality of frame members 21. Therefore, compared to a case where the frame member 21 is formed of a single frame member having the predetermined length Lp in the array direction AD of the frame member 21, the frame member 21 can be easily manufactured. In this way, according to the present embodiment, manufacturing costs of the frame 20 which supports the panel-shaped surface plate 17 disposed along the curved array direction AD can be reduced, and productivity can be improved.

In addition, according to the frame 20 in the present embodiment, each of the plurality of frame members 21 is connected to the surface plate 17 by the plurality of first connecting parts 22, and the pair of frame members 21 disposed adjacent to each other in the array direction AD are connected by the second connecting part 23. The plurality of frame members 21 are connected to the inner peripheral surface 17a of the surface plate 17 in a state of being integrated as one frame 20. Therefore, it is possible to ensure strength for supporting the surface plate 17.

In addition, according to the frame 20 in the present embodiment, the thermoplastic resin material contained in the frame member 21 and the thermoplastic resin material contained in the surface plate 17 are welded in the first connecting part 22. In this manner, the frame member 21 and the surface plate 17 can be firmly connected without increasing the weight by using another connecting member.

In addition, according to the frame 20 in the present embodiment, each portion of the first flange part 21a partitioned by the plurality of slits is deformed to a position in contact with the inner peripheral surface 17a of the surface plate 17. In this manner, the first flange part 21a and the inner peripheral surface 17a of the surface plate 17 can be properly connected.

In addition, according to the frame 20 in the present embodiment, the plurality of second flange parts 21c of the plurality of frame members 21 are integrally connected by the sheet-like second connecting part 23 extending along the array direction AD. Therefore, it is possible to improve strength of the frame 20 in which the plurality of frame members 21 are integrated.

In addition, according to the frame 20 in the present embodiment, the thermoplastic resin material contained in the pair of frame members 21 is welded by the third connecting part 24. In this manner, the pair of frame members 21 can be firmly connected without increasing the weight by using another connecting member.

Second Embodiment

Figure 11:
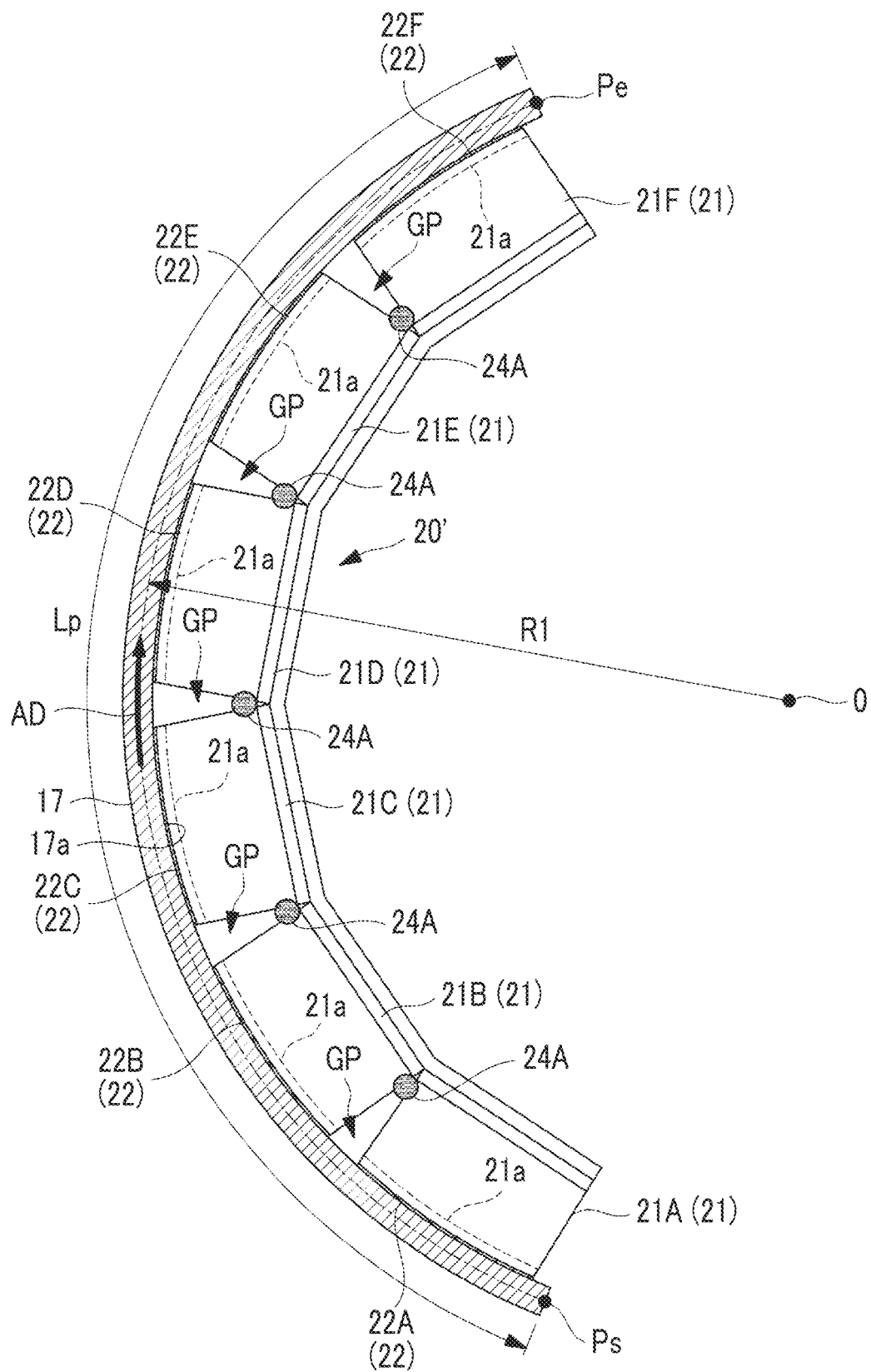
FIG. 11 is a longitudinal sectional view of a panel structural body according to a second embodiment of the present disclosure.
Figure 12:
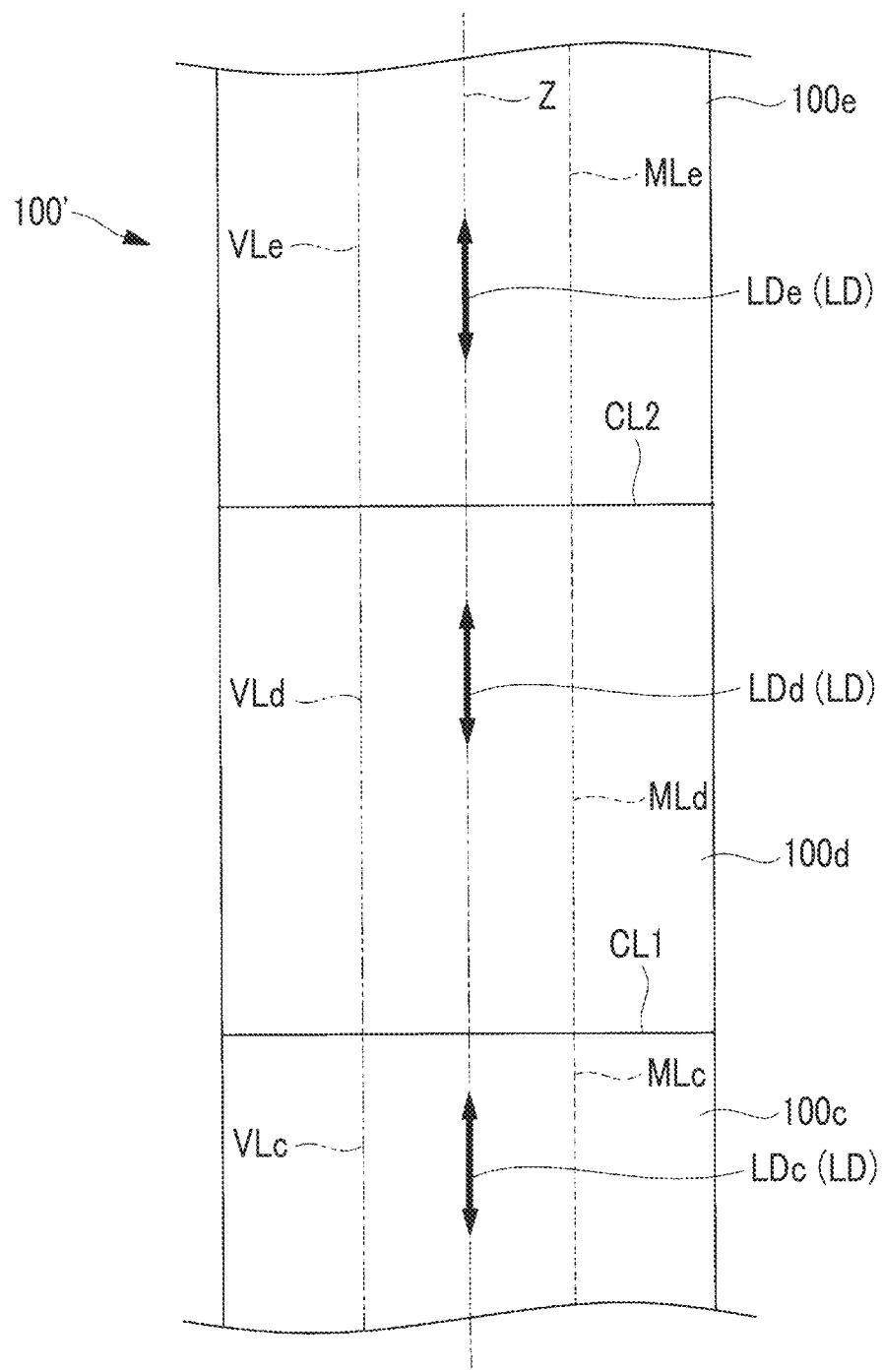
FIG. 12 is a plan view illustrating a laminate before a frame member illustrated in FIG. 11 is molded.

Next, a frame 20' according to a second embodiment of the present disclosure will be described with reference to the drawings. FIG. 11 is a longitudinal sectional view of a panel structural body according to the present embodiment. FIG. 12 is a plan view illustrating a laminate 100' before the frame member 21 illustrated in FIG. 11 is molded. The present embodiment is a modification example of the first embodiment, and is the same as the first embodiment except for cases described below. Thus, description thereof will be omitted below.

The frame 20 of the first embodiment is disposed without a gap along the array direction AD by bringing an end portion in the longitudinal direction of one adjacent frame member 21 along the array direction AD and an end portion in the longitudinal direction of the other frame member 21 are brought into contact with each other. In contrast, the frame 20' of the present embodiment is disposed with a gap GP along the array direction AD between an end portion in the longitudinal direction of one adjacent frame member 21 along the array direction AD and an end portion in the longitudinal direction of the other frame member 21.

As illustrated in FIG. 11, the frame 20' of the present embodiment is provided with a gap GP between the end portion in the longitudinal direction of one adjacent frame member 21 along the array direction AD and the end portion in the longitudinal direction of the other frame member 21.

In the present embodiment, the third connecting part 24A is a part that connects the pair of frame members 21 disposed with the gap GP along the array direction AD. For example, the third connecting part 24A is a part formed by welding the thermoplastic resin material contained in one of the frame members 21 disposed adjacent to each other and the thermoplastic resin material contained in the other of the frame members 21.

In order to mold the plurality of frame members 21 including the frame members 21C, 21D, and 21E, the flat laminate 100' illustrated in FIG. 12 is shaped in a state where the laminate 100' is folded at a right angle through a single shaping process along the mountain folding lines (folding lines) MLc, MLd, and MLe linearly extending along the longitudinal directions LDc, LDd, and LDe parallel to the axis Z, and is shaped in a state where the laminate 100' is folded at a right angle through a single shaping process along the valley folding lines (folding lines) VLc, VLd, and VLe linearly extending along the longitudinal directions LDc, LDd, and LDe.

After one is folded in the width direction along the mountain folding lines MLc, MLd, and MLe and the other in the width direction is folded along the valley folding lines (folding lines) VLc, VLd, and VLe, the laminate 100' is cut by the cutting line CL1 and the cutting line CL2.

The frame member 21 of the first embodiment has a substantially trapezoidal shape in a front view. Accordingly, the cutting lines CL1 and CL2 are lines intersecting with the axis Z without being orthogonal to the axis Z. In addition, the cutting lines CL1 and CL2 have different inclination angles with respect to the axis Z. In contrast, the frame member 21 of the present embodiment has a rectangular shape in a front view. Accordingly, the cutting lines CL1 and CL2 are lines orthogonal to the axis Z. Therefore, compared to the first embodiment, an operation for cutting the laminate becomes easier.

In addition, according to the present embodiment, before the laminate is cut by the cutting line CL1 and the cutting line CL2, one in the width direction is folded through a single shaping process, and the other in the width direction is folded through a single shaping process. As in the first embodiment, compared to a case of shaping after the laminate is cut by the cutting lines CL1 and CL2, the number of shaping processes can be reduced, and productivity can be improved.

The support body (20) in the above-described embodiments can be understood as follows, for example.

The support body according to the present disclosure supports the inner peripheral surface of the panel-shaped structural body (17) disposed along the curved array direction (AD), along the array direction, and has the predetermined length (Lp) along the array direction. The support body includes the plurality of support blocks (21) having the first folding part (21a) having the longitudinal direction (LD) and the short direction (SD), having the length (La) in the longitudinal direction which is shorter than the predetermined length, and folded along the first folding line (ML) extending along the longitudinal direction, and the second folding part (21c) folded along the second folding line (VL) extending along the longitudinal direction, and disposed close to the inner peripheral surface of the structural body along the array direction, and the plurality of first connecting parts (22) that connect each of the plurality of the first folding parts and the structural body. The support body further includes at least one of the second connecting part (23) that connects the plurality of the second folding parts of the plurality of the support blocks, and the third connecting part (24) that connects the pair of the support blocks disposed adjacent to each other in the array direction by joining the end surfaces of the pair of support blocks disposed adjacent to each other in the array direction.

According to the support body in the present disclosure, the support body includes the plurality of support blocks which support the inner peripheral surface of the panel-shaped structural body disposed along the curved array direction, along the array direction, and the support block includes the first folding part folded along the first folding line extending along the longitudinal direction, and the second folding part folded along the second folding line extending along the longitudinal direction. When the support block of the support body according to the present disclosure is molded, the laminate having the plurality of layers formed of the composite material containing the fiber preform and the resin material is merely folded (shaped) along the first folding line and the second folding line. Therefore, compared to a case where the laminate is folded along the curved array direction, a step of folding the laminate is easier, and the laminate is less likely to be wrinkled when the laminate is folded.

In addition, according to the support body in the present disclosure, the length in the longitudinal direction of the support block is shorter than the predetermined length in the array direction of the support body, and the plurality of support blocks are connected to form the support body. Therefore, compared to a case where the support block is formed of a single support block having the predetermined length in the array direction of the support body, the support block can be easily manufactured. In this way, according to the present disclosure, manufacturing costs of the support body which supports the panel-shaped structural body disposed along the curved array direction AD can be reduced, and productivity can be improved.

In addition, according to the support body in the present disclosure, each of the plurality of support blocks is connected to the structural body by the plurality of first connecting parts, and the pair of support blocks disposed adjacent to each other in the array direction are connected by at least one of the second connecting part and the third connecting part. The plurality of support blocks are connected to the inner peripheral surface of the structural body in a state of being integrated as one support body. Therefore, it is possible to ensure strength for supporting the structural body.

According to the support body in the present disclosure, when the plurality of support blocks are connected by the second connecting part, the plurality of second folding parts of the plurality of support blocks are connected. Therefore, the strength of the support body can be improved by integrating the plurality of support blocks.

In addition, according to the support body in the present disclosure, when the plurality of support blocks are connected by the third connecting part, the end surfaces of the pair of support blocks disposed adjacent to each other in the array direction are joined. Therefore, the strength of the support body can be improved by integrating the plurality of support blocks.

In the support body according to the present disclosure, the end portion in the longitudinal direction of one adjacent support block along the array direction and the end portion in the longitudinal direction of the other support block are disposed without a gap. The third connecting part connects the pair of the support blocks disposed along the array direction.

According to the support body in the present disclosure, the end portions in the longitudinal direction of the support blocks disposed without the gap along the array direction are connected by the third connecting part. Accordingly, the strength of the connected support blocks can be improved.

In the support body according to the present disclosure, the gap (GP) is provided between the end portion in the longitudinal direction of one adjacent support block along the array direction and the end portion in the longitudinal direction of the other support block. The third connecting part connects the pair of the support blocks disposed with the gap along the array direction.

According to the support body in the present disclosure, a shape is used in which the support body is disposed with the gap. Therefore, an operation for cutting the laminate forming the support body becomes easier. In addition, the end portions in the longitudinal direction of the pair of support blocks disposed with the gap along the array direction can be connected by the third connecting part, and the plurality of support blocks can be integrated.

In the support body according to the present disclosure, the first folding part has the plurality of slits orthogonal to the array direction and extending along the in-plane direction along the inner peripheral surface of the structural body.

According to the support body in the present disclosure, the plurality of slits are formed in the first folding part disposed to face the inner peripheral surface of the structural body. Therefore, each portion of the first folding part partitioned by the plurality of slits can be deformed along the first folding line. Each portion of the first folding part partitioned by the plurality of slits is deformed to a position in contact with the inner peripheral surface of the structural body. In this manner, the first folding part and the inner peripheral surface of the structural body can be properly connected.

The support body mounting method in the above-described embodiments can be understood as follows, for example.

The support body mounting method according to the present disclosure is a method of mounting the support body formed by connecting the plurality of support blocks for supporting the panel-shaped structural body disposed along the curved array direction, on the inner peripheral surface of the structural body, the support body being formed in an elongated shape having the predetermined length along the array direction. The support body mounting method includes a disposition step (S101) of disposing the plurality of support blocks having the longitudinal direction and the short direction, having a length in the longitudinal direction which is shorter than the predetermined length, having the first folding part folded along the first folding line extending along the longitudinal direction, and the second folding part folded along the second folding line extending along the longitudinal direction, to be close to the inner peripheral surface of the structural body along the array direction, and a first connection step (S102) of connecting each of the plurality of the first folding parts and the structural body. The support body mounting method further includes at least one of a second connection step (S103) of connecting the plurality of the second folding parts of the plurality of support blocks, and a third connection step (S104) of connecting the pair of support blocks disposed adjacent to each other in the array direction by joining the end surfaces of the pair of support blocks disposed adjacent to each other in the array direction.

According to the support body mounting method in the present disclosure, the length in the longitudinal direction of the support block is shorter than the predetermined length in the array direction of the support body, and the plurality of support blocks disposed adjacent to each other in the array direction are connected to form the support body by performing at least one of the second connection step and the third connection step. Therefore, compared to a case where the support block is formed of a single support block having the predetermined length in the array direction of the support body, the support block can be easily manufactured. According to the support body mounting method in the present disclosure, manufacturing costs of the support body which supports the panel-shaped structural body disposed along the curved array direction can be reduced, and productivity can be improved.

In addition, according to the support body mounting method in the present disclosure, each of the plurality of support blocks is connected to the structural body in the first connection step, and the pair of support blocks disposed adjacent to each other in the array direction are connected by performing at least one of the second connection step and the third connection step. The plurality of support blocks are connected to the inner peripheral surface of the structural body in a state of being integrated as one support body. Therefore, it is possible to ensure strength for supporting the structural body.

In addition, according to the support body mounting method in the present disclosure, when the plurality of support blocks are connected by performing the second connection step, the plurality of second folding parts of the plurality of support blocks are integrally connected. Therefore, the strength of the support body can be improved by integrating the plurality of support blocks.

In addition, according to the support body mounting method in the present disclosure, when the plurality of support blocks are connected by performing the third connection step, the end surfaces of the pair of support blocks disposed adjacent to each other in the array direction are joined. Therefore, the strength of the support body can be improved by integrating the plurality of support blocks.

In the support body mounting method according to the present disclosure, in the disposition step, the end portion in the longitudinal direction of one adjacent support block along the array direction and the end portion in the longitudinal direction of the other support block are disposed without the gap. In the third connection step, the pair of the support blocks disposed along the array direction are connected.

According to the support body mounting method in the present disclosure, the end portions in the longitudinal direction of the support blocks disposed without the gap along the array direction are connected by performing the third connection step. Therefore, the strength of the connected support blocks can be improved.

In the support body mounting method according to the present disclosure, in the disposition step, the support body is disposed so that the gap is provided between the end portion in the longitudinal direction of one adjacent support block along the array direction and the end portion in the longitudinal direction of the other support block. In the third connection step, the pair of support blocks disposed with the gap along the array direction are connected.

According to the support body mounting method in the present disclosure, a shape is used in which the support body is disposed with the gap. Therefore, an operation for cutting the laminate forming the support body becomes easier. In addition, the end portions in the longitudinal direction of the pair of support blocks disposed with the gap along the array direction can be connected by the third connecting part, and the plurality of support blocks can be integrated.

REFERENCE SIGNS LIST

17 Surface plate (Structural body)
17a Inner peripheral surface
20, 20' Frame (Support body)
21, 21A, 21B, 21C, 21D, 21E, 21F Frame member (Support block)
21a First flange part (First folding part)
21b Frame body
21c Second flange part (Second folding part)
21d Slit
22, 22A, 22B, 22C, 22D, 22E, 22F First connecting part
23 Second connecting part
24 Third connecting part
100, 100' Laminate
AD Array direction
CL1, CL2 Cutting line
GP Gap
LD Longitudinal direction
ML Mountain folding line (First folding line)
SD Short direction
VL Valley folding line (Second folding line)

The invention claimed is:

1. An elongated support body which supports an inner peripheral surface of a panel-shaped structural body disposed along a curved array direction, along the array direction, and has a predetermined length along the array direction, the support body comprising:
    a plurality of support blocks having a longitudinal direction and a short direction, having a length in the longitudinal direction which is shorter than the predetermined length, having a first folding part folded along a first folding line extending along the longitudinal direction and a second folding part folded along a second folding line extending along the longitudinal direction, and disposed close to the inner peripheral surface of the structural body along the array direction; and
    a plurality of first connecting parts that connect each of the plurality of the first folding parts and the structural body,
    wherein the support body further comprises at least one of
        a second connecting part that connects a plurality of the second folding parts of the plurality of the support blocks, and
        a third connecting part that connects a pair of the support blocks disposed adjacent to each other in the array direction by joining end surfaces of the pair of support blocks disposed adjacent to each other in the array direction, and
    wherein the first folding part has a plurality of slits orthogonal to the array direction and extending along an in-plane direction along the inner peripheral surface of the structural body.

2. The support body according to claim 1,
    wherein an end portion in the longitudinal direction of one of the support blocks adjacent to each other along the array direction and an end portion in the longitudinal direction of the other of the support blocks are disposed without a gap, and
    the third connecting part connects the pair of support blocks disposed along the array direction.

3. The support body according to claim 1,
    wherein a gap is provided between an end portion in the longitudinal direction of one of the support blocks adjacent to each other along the array direction and an end portion in the longitudinal direction of the other of the support blocks, and
    the third connecting part connects the pair of support blocks disposed with the gap along the array direction.

4. A support body mounting method of mounting a support body formed by connecting a plurality of support blocks for supporting a panel-shaped structural body disposed along a curved array direction, on an inner peripheral surface of the structural body, the support body being formed in an elongated shape having a predetermined length along the array direction, the method comprising:
    a disposition step of disposing the plurality of support blocks having a longitudinal direction and a short direction, having a length in the longitudinal direction which is shorter than the predetermined length, having a first folding part folded along a first folding line extending along the longitudinal direction and a second folding part folded along a second folding line extending along the longitudinal direction, to be close to the inner peripheral surface of the structural body along the array direction, wherein the first folding part has a plurality of slits orthogonal to the array direction and extending along an in-plane direction along the inner peripheral surface of the structural body; and
    a first connection step of connecting each of a plurality of the first folding parts and the structural body,
    wherein the support body mounting method further comprises at least one of
        a second connection step of connecting a plurality of the second folding parts of the plurality of support blocks, and
        a third connection step of connecting a pair of support blocks disposed adjacent to each other in the array direction by joining end surfaces of the pair of support blocks disposed adjacent to each other in the array direction.

5. The support body mounting method according to claim 4,
    wherein in the disposition step, an end portion in the longitudinal direction of one of the support blocks adjacent to each other along the array direction and an end portion in the longitudinal direction of the other of the support blocks are disposed without a gap, and
    in the third connection step, the pair of support blocks disposed along the array direction are connected.

6. The support body mounting method according to claim 4,
    wherein in the disposition step, a gap is provided between an end portion in the longitudinal direction of one of the support blocks adjacent to each other along the array direction and an end portion in the longitudinal direction of the other of the support blocks, and
    in the third connection step, the pair of support blocks disposed with the gap along the array direction are connected.

* * * * *